(12) United States Patent
Cheng et al.

(10) Patent No.: US 8,605,431 B2
(45) Date of Patent: Dec. 10, 2013

(54) SUPPORT AND ELECTRONIC DEVICE EMPLOYING SAME

(75) Inventors: Quan-Chang Cheng, Shenzhen (CN); Lin-Lin Pan, Shenzhen (CN); Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 13/241,072

(22) Filed: Sep. 22, 2011

(65) Prior Publication Data

US 2012/0281343 A1 Nov. 8, 2012

(30) Foreign Application Priority Data

May 6, 2011 (CN) .......................... 2011 1 0116762

(51) Int. Cl.
*H05K 7/00* (2006.01)

(52) U.S. Cl.
USPC ............ 361/679.56; 361/679.01; 361/679.55; 248/688; 248/456

(58) Field of Classification Search
USPC ......... 248/688, 454, 455, 456, 460, 461, 462, 248/463, 464, 917; 361/679.01, 679.26, 361/679.3, 679.55, 679.56

See application file for complete search history.

(56) References Cited

U.S. PATENT DOCUMENTS

| | | | |
|---|---|---|---|
| 6,971,622 B2 * | 12/2005 | Ziegler et al. | 248/454 |
| 7,249,739 B2 * | 7/2007 | Chueh et al. | 248/133 |
| 7,549,246 B2 * | 6/2009 | Kuo | 40/601 |
| 2010/0072334 A1 * | 3/2010 | Le Gette et al. | 248/176.3 |

* cited by examiner

*Primary Examiner* — Hoa C Nguyen
*Assistant Examiner* — Amol Patel
(74) *Attorney, Agent, or Firm* — Altis Law Group, Inc.

(57) ABSTRACT

A support is provided for supporting an electronic device on a supporting surface. The support includes a shell configured to receive the electronic device, a frame rotatably connected to the shell, and two adjusting arms. Top ends of the two adjusting arms and two opposite sides of the shell are configured such that the top ends of the two adjusting arms are slidable along longitudinal directions of the two opposite sides of the shell when a user applies force to the support, and further configured for holding the top ends of the two adjusting arms in stationary positions relative to the two opposite sides of the shell when the user does not apply force to the support. Opposite ends of the two adjusting arms are rotatably connected to the frame.

18 Claims, 7 Drawing Sheets

SUPPORT AND ELECTRONIC DEVICE EMPLOYING SAME

BACKGROUND

1. Technical Field

The present disclosure generally relates to supporting devices, and particularly to a support employed by an electronic device such as a mobile phone.

2. Description of Related Art

Mobile phones are not only used for calls or sending and receiving messages these days, but are also used for listening to music, watching television programs and movies, and placing video calls, for example. However, mobile phones are configured for use as hand-held devices, and holding a mobile phone may not always be the most comfortable or convenient way to use its many available functions.

What is needed, therefore, is an electronic device which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will now be made to the drawings to describe the preferred and exemplary embodiments in detail.

Figure 1:
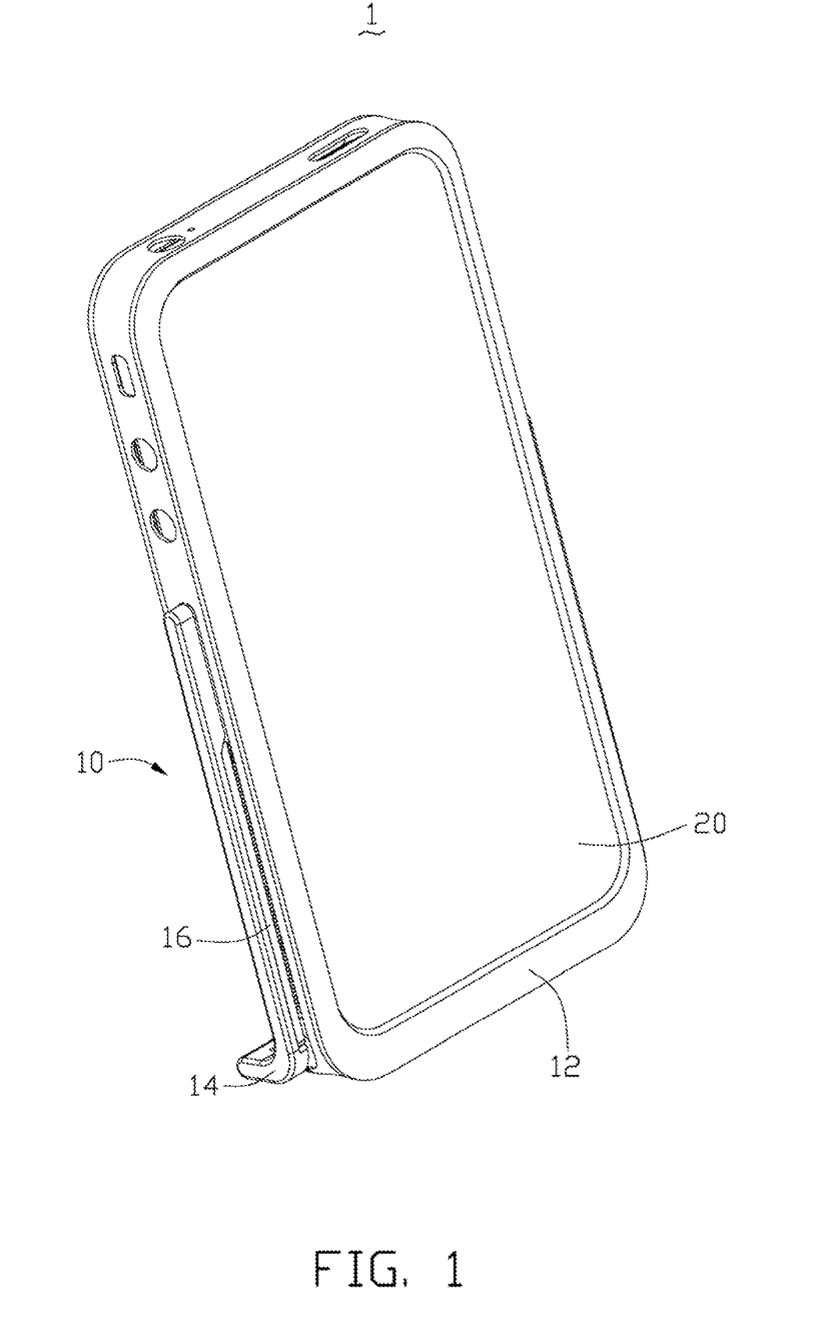
FIG. 1 is a perspective view of an electronic device assembly according to one embodiment, the electronic device assembly having a top end and a bottom end and including a support, wherein the support is shown in a folded state.

Referring to FIG. 1, a perspective view of an electronic device assembly 1 according to one embodiment is shown. The electronic device assembly 1 includes a support 10 and an electronic device 20. The support 10 holds and supports the electronic device 20 on a supporting surface of an object, such as a desk or table. The electronic device 20 may be a mobile phone, a personal digital assistant (PDA), a multi-media player, a tablet computer, and the like.

Figure 2:
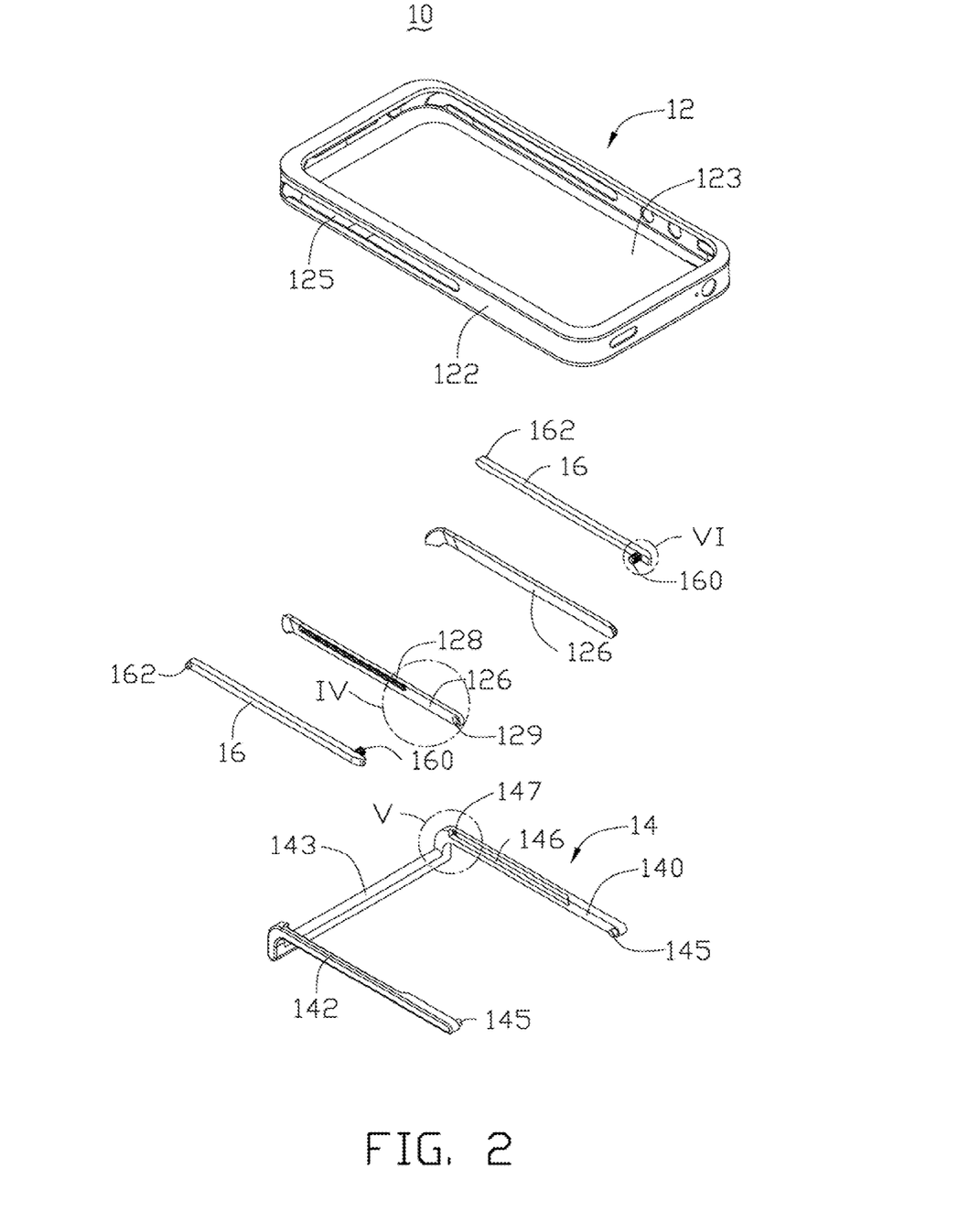
FIG. 2 is an exploded, isometric view of the support in FIG. 1, wherein the support is upended top-to-bottom and is also flipped over front-to-back.
Figure 3:
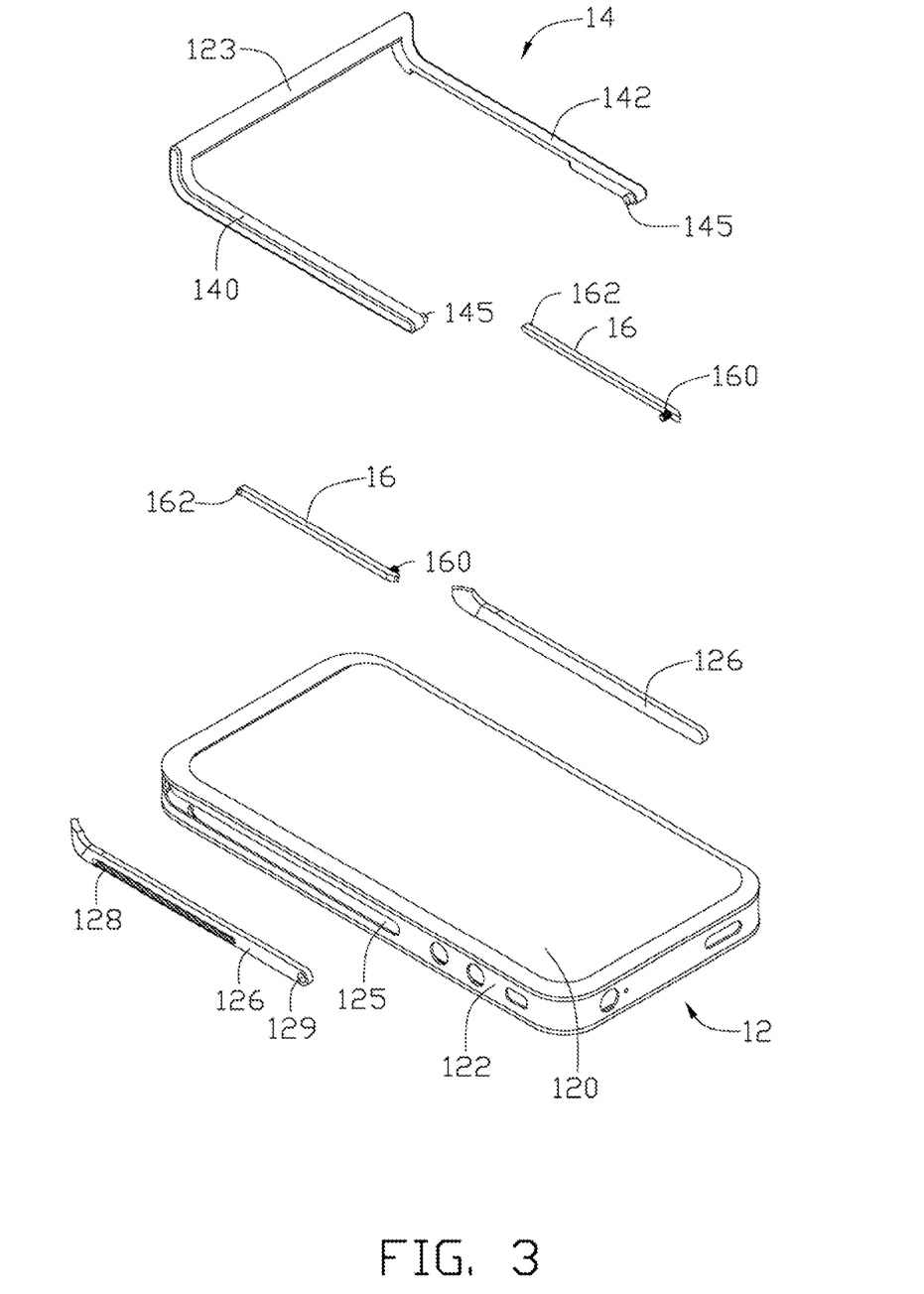
FIG. 3 is an exploded, isometric view of the support in FIG. 1, wherein the support is upended top-to-bottom.

Referring also to FIGS. 2 and 3, FIG. 2 shows an exploded, isometric view of the support 10, wherein the support 10 is upended top-to-bottom and is also flipped over front-to-back; and FIG. 3 shows an exploded, isometric view of the support 10, wherein the support 10 is upended top-to-bottom. The support 10 includes a shell 12, a frame 14, and two adjusting arms 16.

Figure 4:
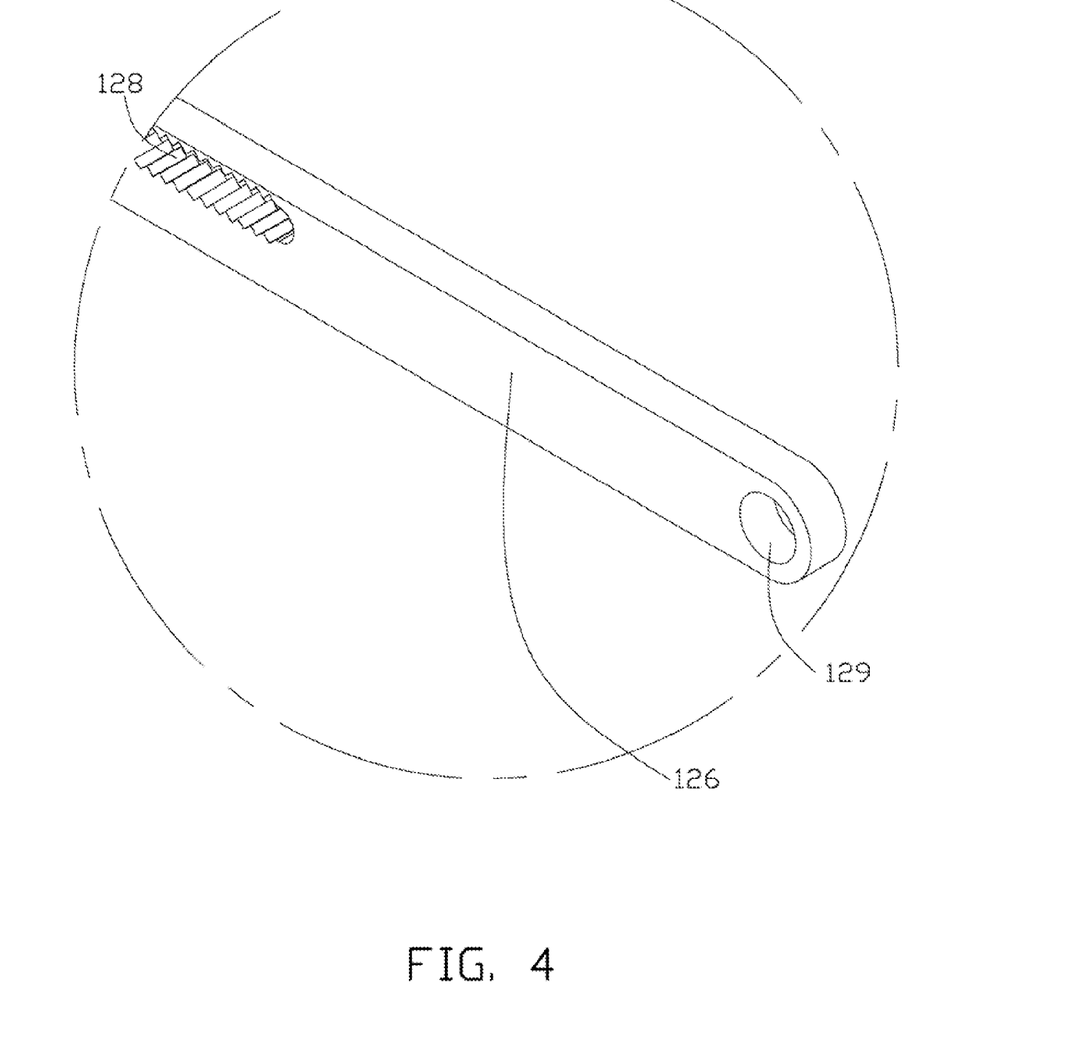
FIG. 4 is an enlarged view of a circled part IV of the support in FIG. 2.

The shell 12 may have a substantially rectangular shape, and includes a rectangular rear plate 120 and four sidewalls 122 perpendicularly extending from four edges of the rear plate 120. The sidewalls 122 include two opposite longer sidewalls 122 ("long" sidewalls 122) and two opposite shorter sidewalls 122 ("short" sidewalls 122). The rear plate 120 and the four sidewalls 122 cooperatively define an accommodating cavity 123 to receive the electronic device 20. An outside surface of each of the long sidewalls 122 defines a holding slot 125. There are also two guiding rods 126 receivable in the holding slots 125. Each of the two guiding rods 126 defines a gear slot 128 and a first axial hole 129. Referring also to FIG. 4, the gear slot 128 defines a plurality of gear teeth on each of upper and lower sides thereof. At least the gear teeth are made of elastically deformable material, such as plastic. In the present embodiment, the gear teeth and the guiding rod 126 are integrally made of elastically deformable material. The first axial hole 129 is defined in a top end of the guiding rod 126.

Figure 5:
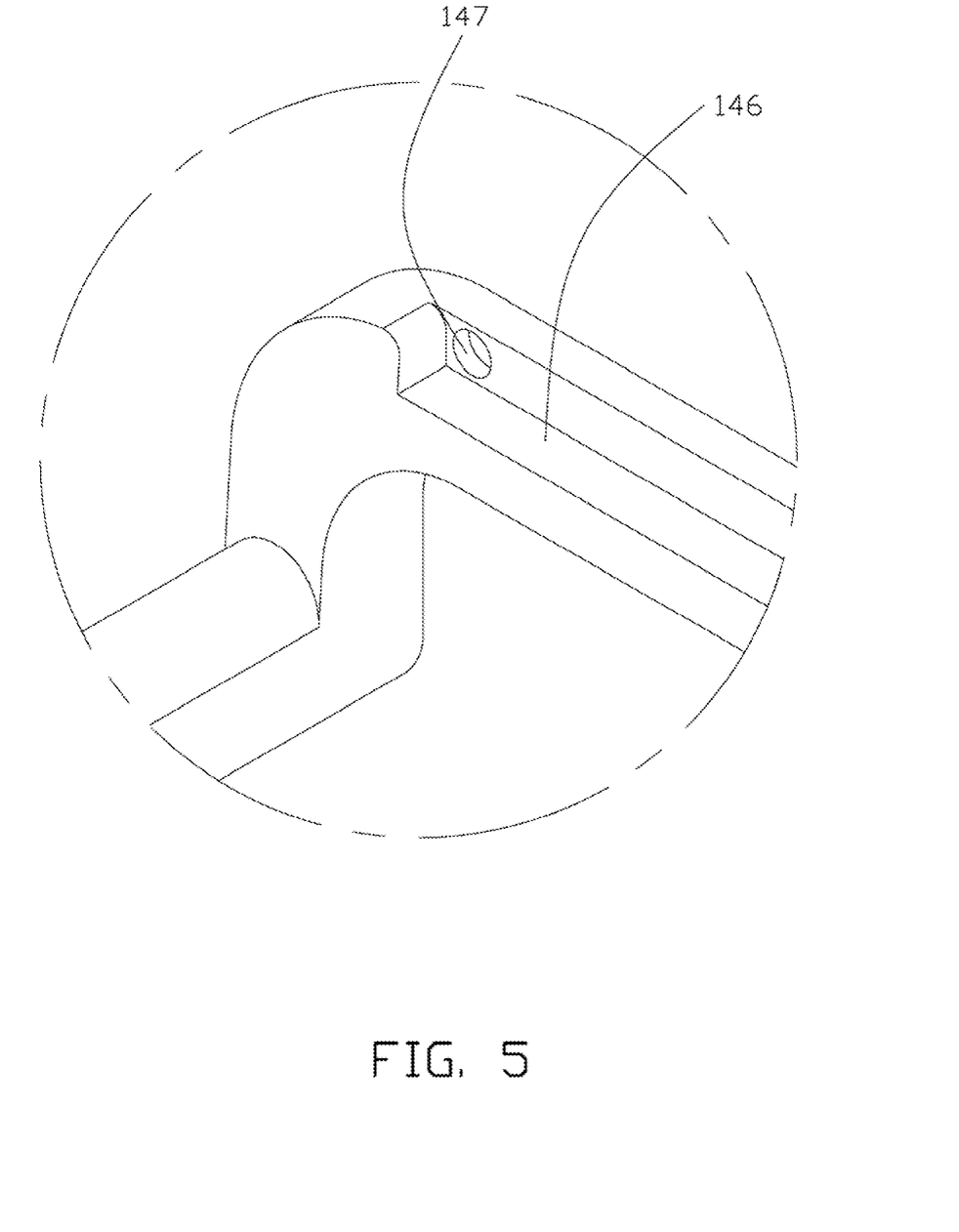
FIG. 5 is an enlarged view of a circled part V of the support in FIG. 2.

The frame 14 may be U-shaped, and includes a first arm 140, a second arm 142, and a connection arm 143 interconnecting the first and second arms 140, 142. Two first pivot pins 145 respectively extend from free ends of the first and second arms 140, 142, toward each other. The first pivot pins 145 are receivable in the first axial holes 129 respectively, and allow the frame 14 to rotate relative to the shell 12. An internal surface of each of the first and second arms 140, 142 includes a long, narrow channel 146. Referring also to FIG. 5, a second axial hole 147 is defined in the opposite end of each of the first and second arms 140, 142, adjacent to the connection arm 143. The second axial hole 147 communicates with the corresponding channel 146.

Figure 6:
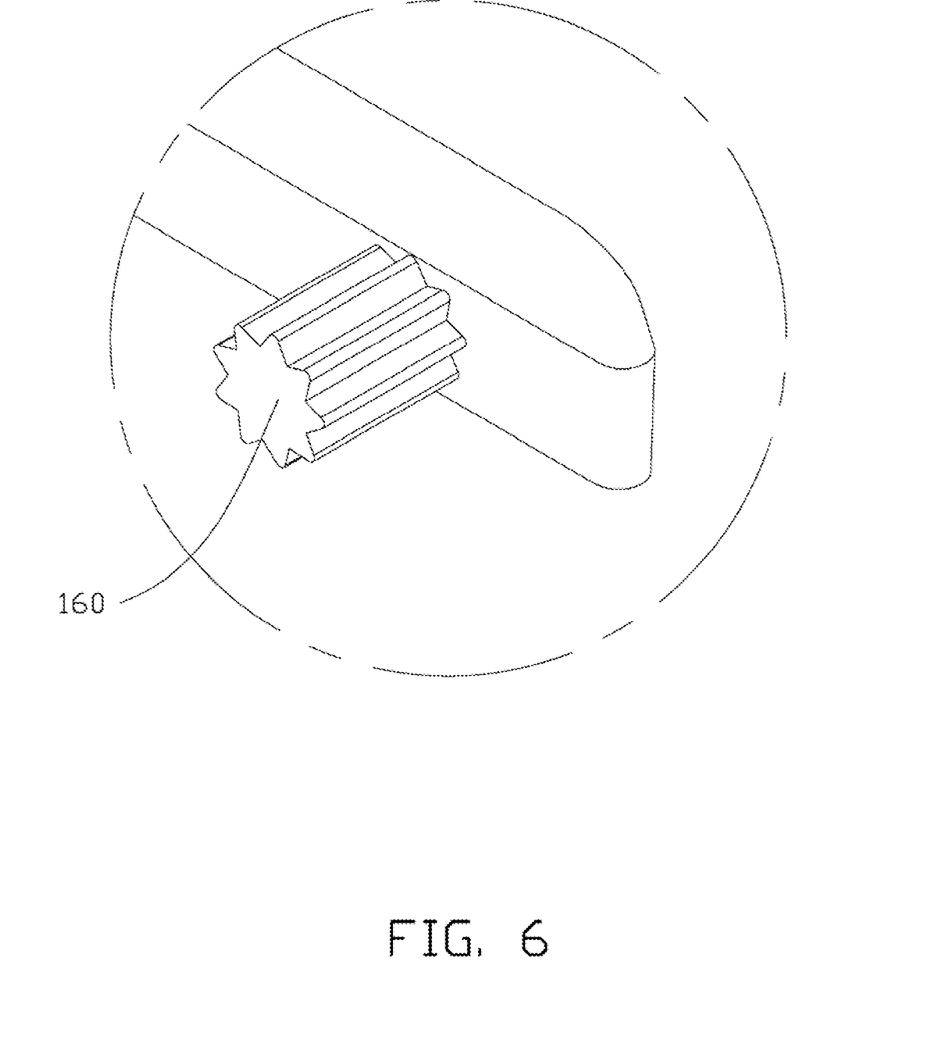
FIG. 6 is an enlarged view of a circled part VI of the support in FIG. 2.

Perpendicularly extending in opposite directions from two opposite ends of each adjusting arm 16 respectively are a toothed gear shaft 160 and a second pivot pin 162. Referring also to FIG. 6, at least the gear teeth of the gear shaft 160 are made of elastically deformable material, such as plastic. In the present embodiment, the gear teeth and the gear shaft 160 are integrally made of elastically deformable material. The gear shafts 160 can rotate relative to the adjusting arms 16. The gear shafts 160 are receivable (i.e., meshable) in the gear slots 128 respectively, and can move along the gear slots 128 to allow the top ends of the two adjusting arms 16 to slide relative to the shell 12. The second pivot pins 162 are receivable in the second axial holes 147 respectively, and allow the adjusting arms 16 to rotate relative to the frame 14.

In assembly of the electronic device assembly 1, the two guiding rods 126 are received and limited (e.g., fitted) in the holding slots 125, respectively. In other embodiments, the two guiding rods 126 can be fixed to the two opposite long sidewalls 122 by screws, or can be integrally formed with the two opposite long sidewalls 122. The gear shafts 160 are received and meshed in the gear slots 128 respectively, to allow the two adjusting arms 16 to be movable relative to the shell 12. The second pivot pins 162 are received in the second axial holes 147 respectively, to allow the adjusting arms 16 to rotate relative to the frame 14. The first pivot pins 145 are received in the first axial holes 129 respectively, to allow the frame 14 to rotate relative to the shell 12.

Referring to FIG. 1 again, this shows an initial position of the electronic device assembly 1, wherein the support 10 is in a folded state. The gear shaft 160 of each of the two adjusting arms 16 rests at a top end of the gear slot 128 of the corresponding guiding rod 126, adjacent to the corresponding first axial hole 129. The two adjusting arms 16 are fittedly received in the channels 146 of the first and second arms 140, 142, respectively. Thus, the two adjusting arms 16 and the first and second arms 140, 142 are parallel with an extending direction of the two guiding rods 126.

Figure 7:
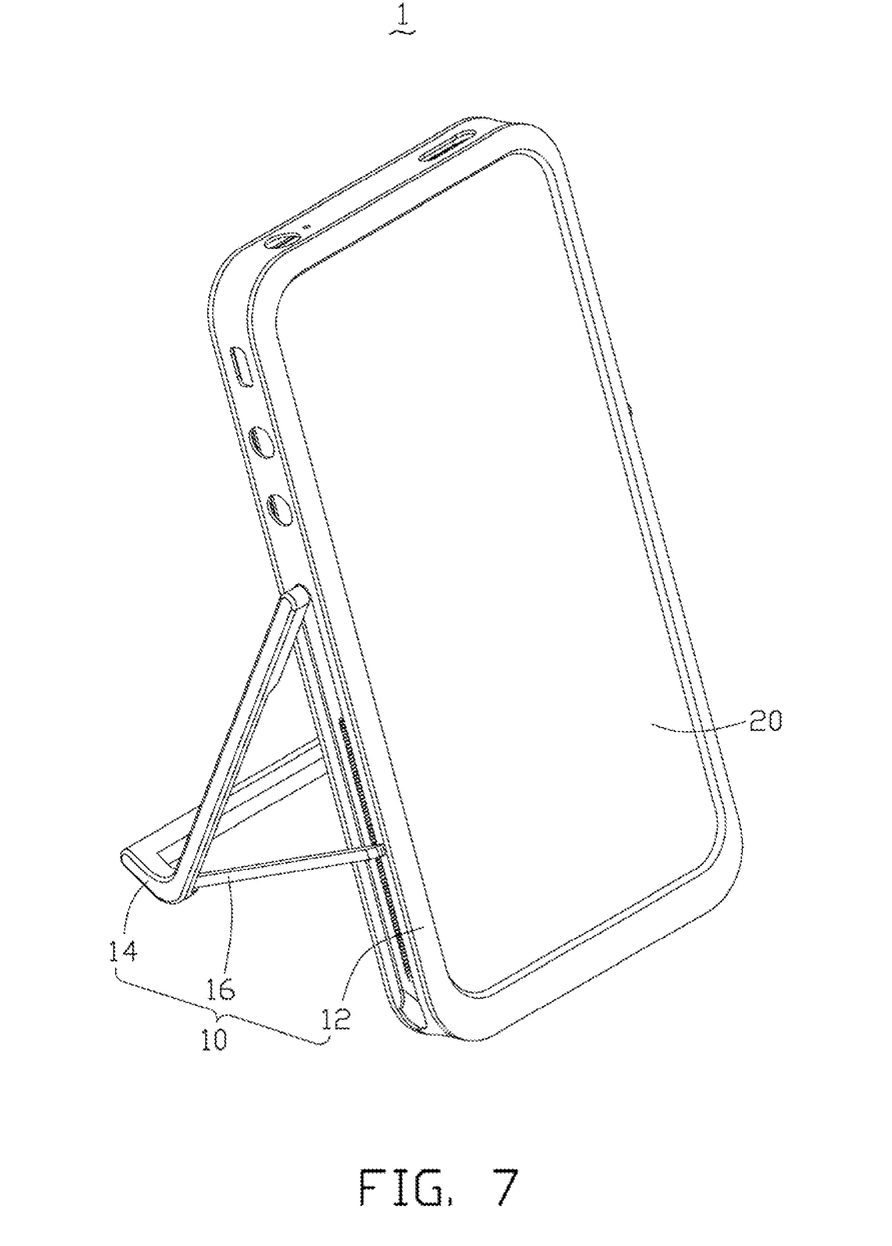
FIG. 7 is similar to FIG. 1, but showing the support in an unfolded state.

Referring to FIG. 7, this shows an operation position of the electronic device assembly 1, wherein the support 10 is in an unfolded state. To move the support 10 from the folded state to the unfolded state, a user applies a force on the support 10, to make the frame 14 rotate relative to the shell 12 and form an included angle between the frame 14 and the shell 12. As a result, the gear shafts 160 are driven to rotate and move down along the gear slots 128, respectively. In this process, both the gear shafts 160 and the adjusting arms 16 elastically deform slightly to allow the gear teeth of the gear shafts 160 to move over the gear teeth of the gear slots 128. When the force ceases to be applied on the support 10, the gear shafts 160 stop rotating, and the gear shafts 160 and the gear slots 128 recover to their original shapes. Therefore the gear shafts 160 are limited in their positions in the gear slots 128 respectively, and the top ends of the two adjusting arms 16 are held stationary in their positions. Thus the support 10 is securely maintained in a desired unfolded state, and the electronic device 20 can be stably supported by the support 10 on a supporting surface of an object.

When a user wants to use the electronic device 20 in a hands free state, for example when he/she desires to watch television programs, the support 10 can be set in the unfolded state to support the electronic device 20 on a desk or a table. The included angle between the frame 14 and the shell 12 can be adjusted by changing the locations of the gear shafts 160 in the gear slots 128. In particular, the user can pull (or push) the connection arm 143 away from or closer to the shell 12, or directly apply force to the top ends of the two adjusting arms 16 to make the gear shafts 160 move to desired locations.

When the user no longer needs the electronic device 20 in the hands free state, the user can conveniently fold the support 10 away. In particular, the user can pull (or push) the connection arm 143 closer to the shell 12 until the two adjusting arms 16 and the first and second arms 140, 142 are parallel with the extending direction of the two guiding rods 126. Alternatively, the user can directly apply force to the top ends of the two adjusting arms 16 to make the gear shafts 160 move to the top ends of the gear slots 128. During such process, the two adjusting arms 16 accordingly drag the first and second arms 140, 142 to become parallel with the extending direction of the two guiding rods 126.

Thus, due to the support 10 being compact and portable and conveniently adjusted, the support 10 is beneficial to the user of the electronic device 20.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A support for supporting an electronic device on a supporting surface, the support comprising:
    a shell configured to receive the electronic device;
    two guiding rods;
    a frame rotatably connected to the shell; and
    two adjusting arms;
    wherein top ends of the two adjusting arms and two opposite sides of the shell are configured such that the top ends of the two adjusting arms are slidable along longitudinal directions of the two opposite sides of the shell when a user applies force to the support;
    the top ends of the two adjusting arms and the two opposite sides of the shell are further configured for holding the top ends of the two adjusting arms in stationary positions relative to the two opposite sides of the shell when the user does not apply force to the support;
    opposite ends of the two adjusting arms are rotatably connected to the frame;
    each of the two opposite sides of the shell defines a gear slot, the top ends of the two adjusting arms are slidable in the gear slots when the user applies force to the support, and the top ends of the two adjusting arms are held in stationary positions in the gear slots when the user does not apply force to the support;
    each of the gear slots defines a plurality of gear teeth on each of upper and lower sides thereof;
    the top end of each of the two adjusting arms comprises a rotatable gear shaft, and the gear shafts are meshed with the gear teeth of the gear slots;
    each of the gear shafts comprises a plurality of gear teeth, and at least the gear teeth of the gear slots and the gear teeth of the gear shafts are made of elastically deformable material;
    the frame is U-shaped, and comprises a first arm, a second arm and a connection arm interconnecting the first and second arms;
    free ends of the first and second arms are rotatably connected to the two opposite sides of the shell, respectively;
    the opposite ends of the two adjusting arms are rotatably connected to the first and second arms of the frame adjacent to the connection arm, respectively; and
    each of the two opposite sides of the shell defines a holding slot therein, the two guiding rods are disposed in the holding slots, and the gear slots are defined in the two guiding rods.

2. The support of claim 1, wherein the gear teeth of the gear slots and the gear teeth of the gear shafts are made of plastic.

3. An electronic device assembly comprising:
    an electronic device; and
    a support holding the electronic device and provided for supporting the electronic device on a supporting surface when required, the support comprising:
    a shell receiving the electronic device, each of two opposite sides of the shell defining a holding slot therein;
    two guiding rods disposed in the holding slots, respectively, each of the guiding rods defining a gear slot therein;
    a frame rotatably connected to the shell; and
    two adjusting arms;
    wherein top ends of the two adjusting arms are slidable in the gear slots along longitudinal directions of the two opposite sides of the shell when a user applies force to the support;
    the top ends of the two adjusting arms are held in stationary positions in the gear slots when the user does not apply force to the support; and
    opposite ends of the two adjusting arms are pivotally connected to the frame.

4. The electronic device assembly of claim 3, wherein each of the gear slots defines a plurality of gear teeth on each of upper and lower sides thereof.

5. The electronic device assembly of claim 4, wherein the top end of each of the two adjusting arms comprises a rotatable gear shaft, and the gear shafts are meshed with the gear teeth of the gear slots.

6. The electronic device assembly of claim 5, wherein each of the gear shafts comprises a plurality of gear teeth, and at least the gear teeth of the gear slots and the gear teeth of the gear shafts are made of elastically deformable material.

7. The electronic device assembly of claim 6, wherein the frame is U-shaped, and comprises a first arm, a second arm and a connection arm interconnecting the first and second arms.

8. The electronic device assembly of claim 7, wherein free ends of the first and second arms are pivotally connected to the two opposite sides of the shell, respectively.

9. The electronic device assembly of claim 8, wherein the opposite ends of the two adjusting arms are pivotally connected to the first and second arms of the frame adjacent to the connection arm, respectively.

10. The electronic device assembly of claim 9, wherein the first and second arms each define a channel, the channels receiving the two adjusting arms, respectively, when the support is in a folded state.

11. A support for supporting an electronic device on a supporting surface, the support comprising:
a shell receiving the electronic device, each of two opposite sides of the shell defining a holding slot therein;
two guiding rods disposed in the holding slots, respectively, each of the guiding rods defining a gear slot therein; and
a frame rotatably connected to the shell;
wherein top ends of the two adjusting arms are slidable in the gear slots along longitudinal directions of the two opposite sides of the shell when a user applies force to the support;
the top ends of the two adjusting arms are held in stationary positions in the gear slots when the user does not apply force to the support; and
opposite ends of the two adjusting arms are pivotally connected to the frame.

12. The support of claim 11, wherein each of the gear slots defines a plurality of gear teeth on each of upper and lower sides thereof.

13. The support of claim 12, wherein the top end of each of the two adjusting arms comprises a rotatable gear shaft, and the gear shafts are meshed with the gear teeth of the gear slots.

14. The support of claim 13, wherein each of the gear shafts comprises a plurality of gear teeth, and at least the gear teeth of the gear slots and the gear teeth of the gear shafts are made of elastically deformable material.

15. The support of claim 14, wherein the frame is U-shaped, and comprises a first arm, a second arm and a connection arm interconnecting the first and second arms.

16. The support of claim 15, wherein free ends of the first and second arms are pivotally connected to the two opposite sides of the shell, respectively.

17. The support of claim 16, wherein the opposite ends of the two adjusting arms are pivotally connected to the first and second arms of the frame adjacent to the connection arm, respectively.

18. The support of claim 17, wherein the first and second arms each define a channel, the channels receiving the two adjusting arms, respectively, when the support is in a folded state.

* * * * *